United States Patent [19]
Barnes et al.
[11] Patent Number: 4,951,326
[45] Date of Patent: Aug. 28, 1990

[54] RETURN FITTING WITH RELEASABLE CAP

[75] Inventors: Steven R. Barnes; Lester R. Mathews, both of Phoenix, Ariz.
[73] Assignee: Caretaker Systems, Inc., Scottsdale, Ariz.

[21] Appl. No.: 475,909
[22] Filed: Feb. 6, 1990
[51] Int. Cl.[5] .......................... E04H 3/18; F16L 35/00
[52] U.S. Cl. .......................................... 4/494; 4/507; 4/546; 29/418; 285/3; 285/901; 138/90; 138/100
[58] Field of Search .................... 4/488, 492, 494, 506, 4/507, 541, 542, 546; 29/418, 426.4; 285/3, 4, 901; 138/90, 100

[56] References Cited

U.S. PATENT DOCUMENTS

| | | | |
|---|---|---|---|
| 1,213,466 | 1/1917 | Delanoy et al. | 285/3 X |
| 1,873,274 | 8/1932 | Boosey | 138/90 |
| 4,005,842 | 2/1977 | Lane | 29/418 X |
| 4,261,598 | 4/1981 | Cornwall | 285/901 X |
| 4,281,422 | 8/1981 | Simonelli | 4/506 X |
| 4,368,550 | 1/1983 | Stevens | 4/507 |
| 4,406,026 | 9/1983 | Steimle | 4/492 |
| 4,561,134 | 12/1985 | Mathews et al. | 4/506 X |
| 4,623,170 | 11/1986 | Cornwall | 285/4 |
| 4,733,888 | 3/1988 | Toelke | 285/4 |
| 4,785,655 | 11/1988 | Pistritto et al. | 29/418 X |

*Primary Examiner*—Ernest G. Cusick
*Assistant Examiner*—Robert M. Fetsuga
*Attorney, Agent, or Firm*—LaValle D. Ptak

[57] ABSTRACT

A retaining ring of an eyeball return fitting of the type used in swimming pools and spas is provided with a releaseable or breakaway cover cap. The cap closes the end of the return fitting during construction. This permits the finish work for the cement and plaster stages of the pool construction to be effected without the danger of cement or plaster getting into the fitting during construction. After construction has been completed, the cap is released and drops away, carrying with it any cement or plaster which may have hardened on it during construction.

21 Claims, 2 Drawing Sheets

RETURN FITTING WITH RELEASABLE CAP

BACKGROUND

Swimming pools and hydrotherapy spas frequently are made of concrete or gunnite cement with a plaster finish. In the construction of such pools and spas, the plumbing first is put in place; and the various fittings are attached to the terminal ends of the plumbing pipes for construction into the walls of the pool. Such fittings include "in-floor" housings for pool cleaning heads, as well as the housings for return fittings, such as the eyeball fittings used with spas and many pools.

Although the fitting housings are intended to be imbedded in the concrete and plaster of the pool walls and floors, it is important not to splash either cement or plaster into the fitting interiors. This requires the workmen who pour and finish the concrete and plaster surfaces to be extremely careful when working around the fittings. Frequently, cement or plaster gets into the internal threads on a return eyeball fitting, for example; and this cement or plaster must be removed from these threads when the eyeball and retaining ring are put into the fitting for subsequent use. This results in additional labor costs. If any cement or plaster residue remains in the fitting, it can damage the bearing surfaces between the fitting and rotatable eyeball. This impairs adjustability and hastens wear of the eyeball.

If the eyeball and retaining ring are placed in such a fitting during the cement and plaster construction phases of the building of the pool, the spilled-over cement or plaster can splash onto the surface of the eyeball. Again, this can result in impaired adjustability and accelerated wear. Frequently, it is necessary to remove the retaining ring and the eyeball and to clean all of the surfaces thoroughly, followed by reassembly prior to the actual use of the pool.

To prevent concrete and plaster from splashing into the interior of an open fitting or one in which the retaining ring and eyeball are in place, it is possible to close the open end of the fitting with duct tape or similar material during the concrete and plastering stages of construction. Although this effectively prevents the intrusion of concrete or plaster into the fitting, time still is consumed for placing the tape over the fitting, followed by the subsequent removal of the duct tape after the construction is completed.

It is desirable to provide a temporary cover for the return fitting of a pool or spa which is placed on the fitting prior to the concrete and plaster stages of construction and which is quickly and simply removed upon completion of construction.

SUMMARY OF THE INVENTION

It is an object of this invention to provide an improved pool and spa fitting structure.

It is another object of this invention to provide an improved return fitting for a pool or spa.

It is a further object of this invention to provide a breakaway cap for the retainer ring of a return fitting for pools and spas.

It is yet another object of this invention to provide an improved breakaway cap for temporarily closing the opening of the return fitting for a pool and spa during construction.

In accordance with the preferred embodiment of this invention, a retaining ring for a return fitting used in spas and pools has a releasable cover cap temporarily over it for closing the return fitting during construction. After completion of construction, the releasable cover cap is removed from the retaining ring.

DETAILED DESCRIPTION

Figure 5A:
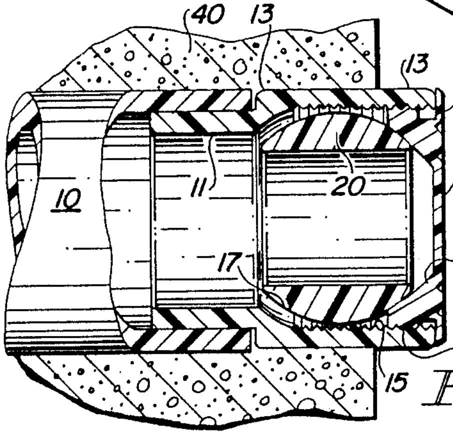
FIG. 5A is a partial cross-sectional view of the assembled embodiment of FIG. 1 in place at a first stage of construction.
Figure 3:
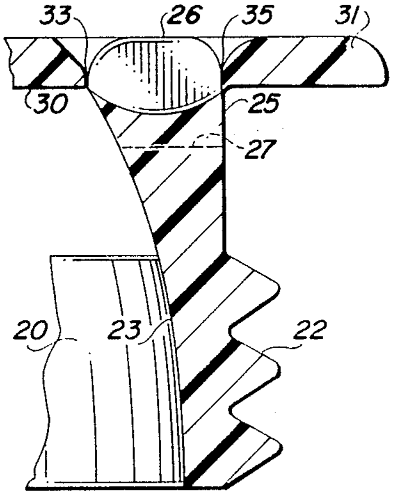
FIG. 3 is an enlarged partial cross-sectional view taken along the line 3—3 of FIG. 2.

Reference now should be made to the drawing in which the same reference numbers are used through the different figures to designate the same or similar components. A return water pipe 10, of the type typically used for swimming pools and spas to return water to the pool or spa after it is circulated from the filter, is illustrated. Such return pipes are located at one or more locations, generally in the side walls, of the pool or spa. Spas, in particular, use "eyeball" fittings which are capable of adjusting the direction of the flow of water passing out of the return pipe 10. Such a fitting includes a portion 11 which is attached to the end of the return pipe 10. Since the pipes 10 and the fitting portion 11 typically are made of PVC plastic, these components are welded together with a suitable solvent in most installations. The fitting also includes a main body portion 13, which is ribbed on the external surface to cause it to be secured against turning in the concrete wall of the pool or spa in which it is installed. The portion 13 has internal threads 15 extending inwardly from the open end to terminate at a concave section 17 which comprises a spherical bearing surface. This surface 17 is made to mate with or engage the outer spherical surface of an "eyeball" 20, which has a hollow cylindrical passage through it. This passage is shown most clearly in FIGS. 5A, 6A and 8A.

Figure 1:
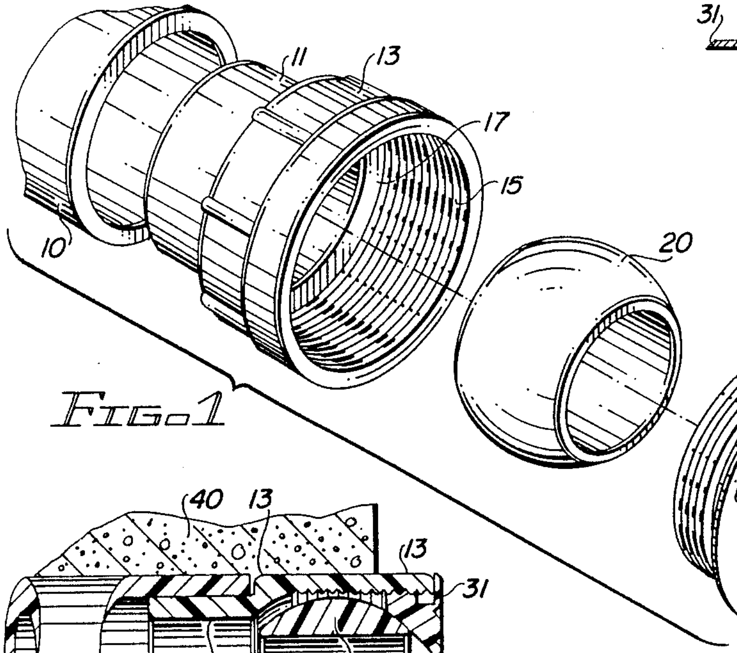
FIG. 1 is an exploded, perspective view of a preferred embodiment of the invention.

A standard eyeball return fitting then includes a retaining ring, such as the retaining ring 22 shown in FIG. 1, to hold the other side of the spherical eyeball 20 in place. The ring 22 is externally threaded to mate with the internal threads 15 of the fitting housing 13. The retaining ring 22 also has an opening through it which is at least as large as the opening through the eyeball 20. In addition, the inner surface of the ring 22 adjacent the opening is a section of a sphere which mates with the outer spherical surface of the eyeball 20 to provide a bearing surface 23 opposite the surface 17 located in the fitting 13.

In use, the retaining ring 22 is turned into snug engagement with the eyeball 20 to hold the eyeball 20 between the surface 17 and 23 in a desired position. If movement of the eyeball 20 to a different rotational position is desired, the retaining ring 22 is rotated to release the pressure on the eyeball 20 to permit adjustment of the position of the eyeball 20. Once this has been accomplished, the ring 22 once again is turned to tightly engage the surface 23 against the eyeball 20.

It is readily apparent that the rotation of the ring 22 in a clockwise direction causes it to move inwardly to clamp the eyeball 20 between the surfaces 17 and 23, while rotation of the ring 22 in a counter-clockwise direction tends to move the ring outwardly from the interior of the fitting 13 to release the eyeball 20. The effect of this is a telescoping motion, the direction of which is dependent upon the direction of rotation of the ring 22.

Figure 2:
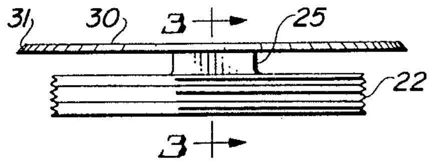
FIG. 2 is a side view of a portion of the embodiment shown in FIG. 1.

Typical eyeball fitting retaining rings, such as the ring 22, include a pair of spaced-apart projections 25 located on diametrically opposite sides of the retaining ring 22, as illustrated in FIGS. 1 and 2. The apparatus which has been described thus far is standard and well known. A problem with such a fitting, however, is that during the installation of the fitting in the wall of a cement pool to which a plaster finish coat is added, cement and plaster debris can enter into the fitting. If the retaining ring and eyeball 20 are not installed until later, such debris can clog the threaded portion 15 of the housing 13. If the retaining ring and eyeball 20 are installed, the plaster can get into the eyeball 20 itself and on the bearing surface 23 to impair the operation of the fitting when it is subsequently used.

Figure 4:
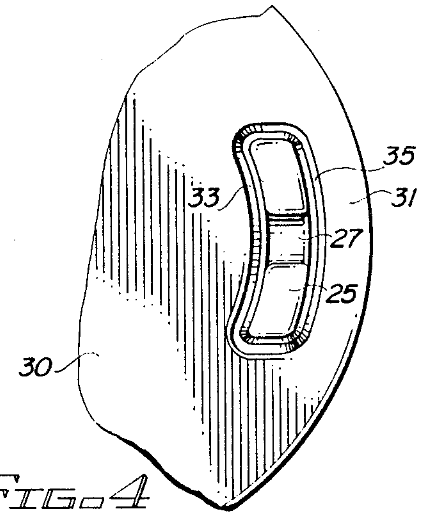
FIG. 4 is an enlarged top view of a detail of the embodiment shown in FIGS. 1 and 2.

In order to overcome the problem mentioned above, the otherwise standard eyeball fitting and retainer ring 22 has been modified, in the embodiment of FIGS. 1 to 5, to form the retaining ring 22 with a releasable or breakaway cap or cover 30 for the purpose of closing off or sealing the open end of the housing 13 of the fitting attached to the end of the water return pipe. The projections 25 have been modified to form a depression 27 in each of them, as illustrated most clearly in FIGS. 2 and 3. The cap 30 then is integrally formed as part of the same plastic casting that is used to form the retaining ring 22 and projections 25 by attaching it to the projections 25 through a thin, weakened or frangible portion 33 and 35 surrounding each of the projections 25. This is illustrated most clearly in FIGS. 3 and 4. These areas of weakening are shown in FIG. 4 by the sharp notches or grooves 33 and 35 around the projections 25.

The portion of the cover 30 on the outside of the projections 25, or to outside of the weakened areas 33 and 35, constitutes a flange 31 which extends all the way around the outer periphery of the cap 30. As illustrated most clearly in FIG. 5A, the flange 31 of the cap 30 overlies the open end of the threaded portion of the housing 13. Thus, when the retaining ring is rotated, either by hand or with a tool having a pair of spaced-apart projections for fitting into the depressions 27, to the position shown in FIG. 5A, the cap 30 and flange 31 completely cover the open end of the fitting 13. This protects the fitting against the intrusion of any concrete or plaster into the fitting. It also permits the entire fitting to be preassembled into the position shown in FIG. 5A for delivery to the construction site, thereby ensuring that contaminants and debris do not enter the fitting at any time during construction. As is readily apparent from FIG. 5A, the eyeball 20 is not tightly wedged between the surfaces 17 and 23, but is loosely retained in place.

After the concrete 40 of the pool wall has set, a plaster layer 45 is added to bring the pool surface flush with the end of the fitting 13 and to provide the desired finished look to that pool surface. Typically, the plaster 45 is applied by hand. Since the cap 30 and the flange 31 on it completely cover the opening in the fitting, the workman applying the final plaster stage does not need to be concerned about any plaster getting into the inside of the fitting 13.

Figure 5B:
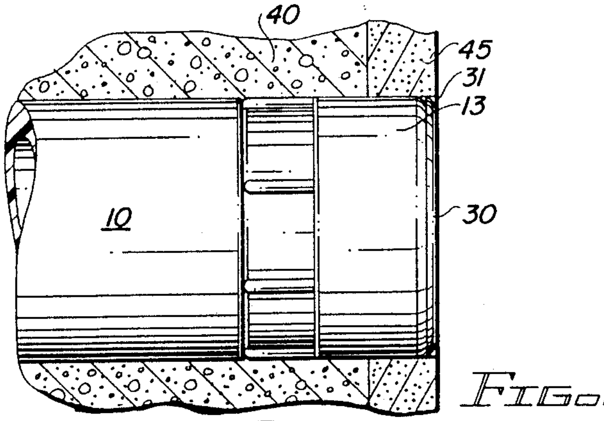
FIG. 5B is a side view of the embodiment of FIG. 5A at a second stage of construction.
Figure 5C:
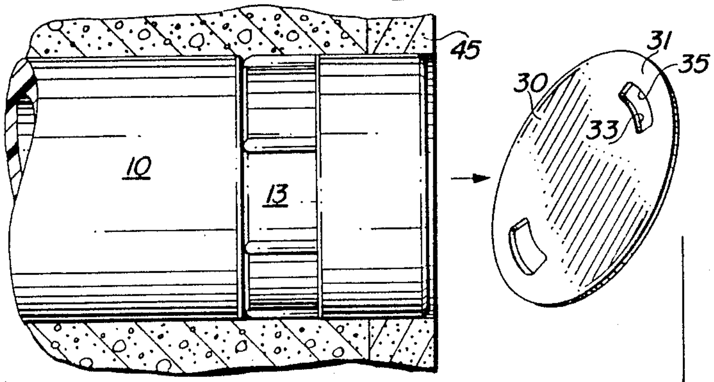
FIG. 5C illustrates the embodiment of FIGS. 5A and 5B in a fully assembled view showing the result of the final stage of installation of the embodiment of FIG. 1.

Once the plaster 45 has been brought out to the level shown in FIG. 5B, a tool is inserted into the recesses 27 to rotate the retaining ring 22 in a clockwise direction. This causes it to move inwardly to seat the eyeball 20 in place where it is wedged between the bearing surfaces 17 and 23. As the retaining ring 22 moves inwardly, the pressure on the flange 31 caused by the open end of the fitting 13 is sufficient to break the cap 30 and flange 31 away from the projections 25 at the weakened areas 33 and 35. When this occurs, the cap 30 simply falls away, as illustrated in FIG. 5C. The retaining ring 22 and the eyeball 20 then are fully installed in place in a conventional manner. In fact, once the cap 30 has broken away, the entire structure has the appearance of a conventional eyeball fitting with a retaining ring in it.

Figure 6A:
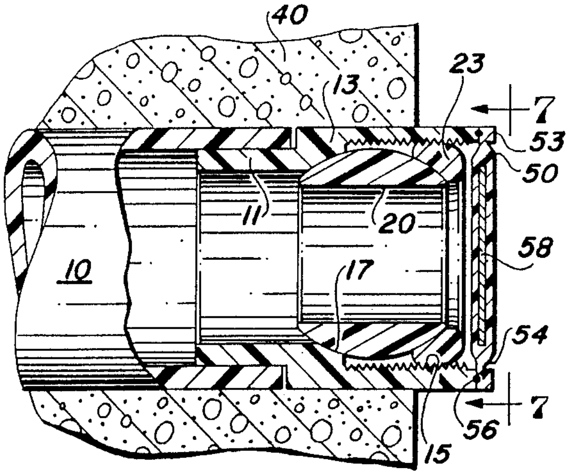
FIGS. 6A and 6B are partial cross-sectional views of another embodiment of the invention in different stages of construction.
Figure 7:
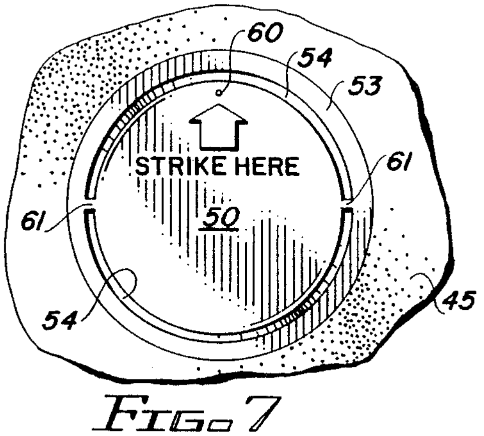
FIG. 7 is a top view of the embodiment of FIGS. 6A and 6B.
Figure 6B:
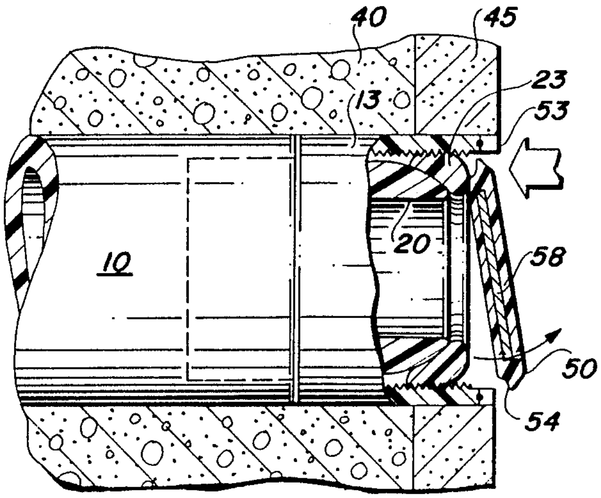

Another embodiment, accomplishing the same purpose as the embodiment of FIGS. 1 through 5, is shown in FIGS. 6A, 6B, and 7. This alternative embodiment is for a preassembled eyeball fitting in which the eyeball 20 is preinstalled and held in place by the retaining ring 23 of an otherwise standard fitting. A cap 50 has a main central portion 50 secured by means of a frangible web or weakened area 54 about its periphery to an outer ring 53. The circumference of the composite cap, including the outer ring 53, is equal to the outer circumference of the housing 15 of the eyeball fitting. After the fitting has been preassembled, the outer ring 53 of the cap is bonded by a welded joint or otherwise at 56 to the outer edge of the housing 13 of the fitting. As illustrated in FIG. 7, the central portion 50 is attached throughout almost the entire circumference to the outer ring 53 through the weakened area 54.

At two diametrically opposite points, however, a pair of tabs 60 and 61 form an integral connection between the parts 50 and 53 without the weakened areas 54. These tabs 60 and 61 are very narrow, and operate as pivot points during the removal of the cap.

As shown in FIG. 6A the entire eyeball assembly is installed in the pool wall 40 prior to the plastering stage which adds the plaster layer 45. The plaster 45 is finished flush with the ring 53 of the temporary cap. Consequently, the entire assembly may be troweled into place and smoothed adjacent the ring 53 without any concern for getting any plaster into the fitting, since the central portion 50 of the cap, weakened area 54, and ring 53 totally seal the end of the housing 13 during this stage of construction.

After plastering has been completed, the end of the trowel, a hammer, or other suitable tool is used to strike the cap 50 at the point 60 shown in FIG. 7 to tilt it or pivot it about the somewhat stronger pivot tabs 60 and 61 in the manner shown in FIG. 6B. The weakened or frangible areas 54 break to sever the cap in the manner illustrated in FIG. 6B. The central portion 50 of the cap then may be pryed away to complete breaking of the tabs 60 and 61 to remove it. Once this has been accomplished, the eyeball fitting may be adjusted in a conventional manner.

Figure 8B:
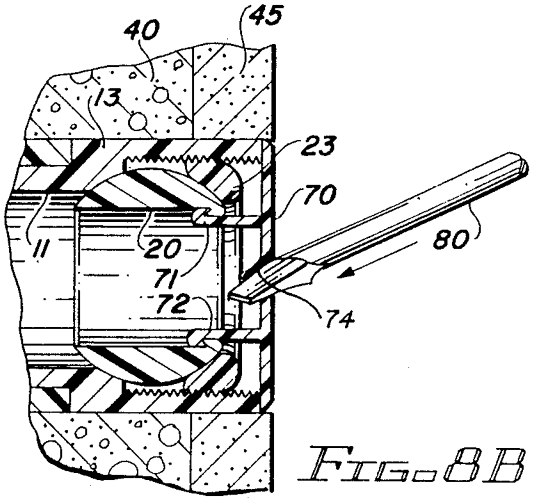
FIGS. 8A and 8B are partial cross-sectional views of a third embodiment of the invention in different stages of construction.
Figure 9:
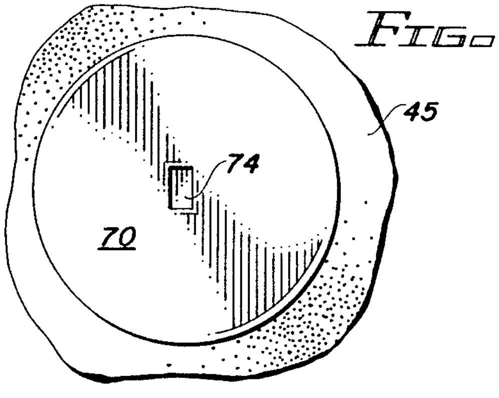
FIG. 9 is a top view of the embodiment of FIGS. 8A and 8B.
Figure 10:
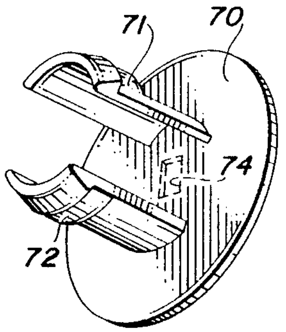
FIG. 10 is a bottom perspective view of the embodiment of FIGS. 8 and 9.

FIGS. 8 through 10 illustrate a third embodiment of the invention which may be employed. In the embodiment shown in FIGS. 8 through 10, a cap 70 has an outer circumference equal to the outer circumference of the housing 13 comparable to the other embodiments which have been described. There are no areas of weakening in this cap 70, however. Instead, a thin frangible slot 74 is formed in the center of the cap 70. During construction this slot 74 is covered with a thin web of the same material out of which the cap 70 is made, so that the entire end of the housing 13 is covered when the plaster layer 45 is formed in the pool.

Figure 8A:
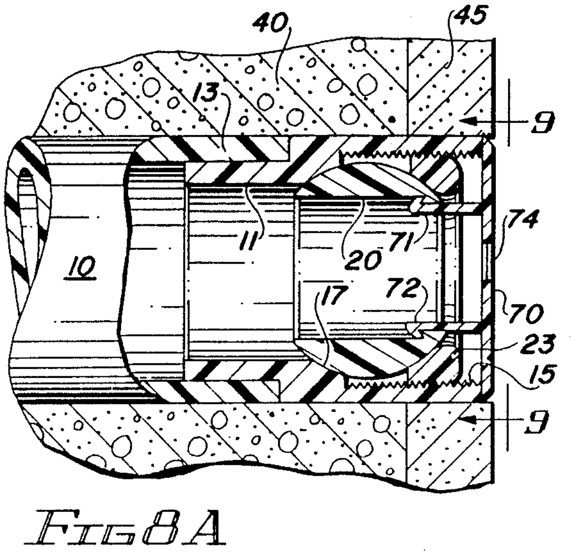

In the embodiment of FIGS. 8 through 10, however, the underside of the cap 70 has a pair of diametrically opposed, spaced-apart, hook-like projections 70 and 72 extending from it. These projections are dimensioned to fit inside a shoulder typically formed on the front of the inner surface of an eyeball 20. The cap then is captivated by the eyeball 20, as illustrated in FIG. 8A. After the plastering step is completed, a screwdriver 80 or similar tool is pushed into the slot 74 to break the thin web covering this slot. This is shown in FIG. 8B. After the screwdriver 80 is inserted, it then may be rocked to pry the projections 71 and 72 away from the eyeball 20. The cap 70 then is discarded, as with the other embodiments.

In the embodiment shown in FIGS. 6A and 6B, a metal disk 58 also is illustrated as molded into or embedded into the center of the cap 50. This metal disk or its equivalent may be used with all of the embodiments to facilitate locating the caps in the event the fittings are covered over with a thin layer of plaster during the plastering operation. Any suitable metal detector can be used to locate the cap. Obviously, once the cap has been located, it can be removed in accordance with the various techniques which have been described, depending upon the type of cap which has been used.

The foregoing description of the preferred embodiment of the invention is to be considered as illustrative of the invention and not as limiting. Various changes and modifications will occur to those skilled in the art without departing from the true scope of the invention, as defined in the appended claims.

We claim:

1. An improvement in spa and pool return fittings having a water discharge pipe portion with an open end, said improvement including in combination:

a retaining ring, with first and second ends, constructed for telescoping movement of the first end thereof into the inside of the open end of a water discharge pipe portion;

a cover cap releasably attached to the second end of said retaining ring, said cap having an outer flange portion dimensioned to overlie, contact, and cover the open end of a water discharge pipe portion, with said retaining ring telescoped into the open end of such water discharge pipe portion a first predetermined distance; and means for effecting release of said cover cap when said retaining ring is moved into said water discharge pipe portion a second predetermined distance which is greater than said first predetermined distance.

2. The combination according to claim 1 further including a metal member secured to said cover cap for facilitating location of said cover cap.

3. The combination according to claim 1 further including first and second spaced-apart support means attached to the second end of said retaining ring and extending outwardly therefrom for supporting said cover cap a predetermined spaced distance from the second end of said retaining ring.

4. The combination according to claim 3 wherein said means for effecting release of said cover cap comprises a weakened region of attachment of said cover cap to said second end of said retaining ring.

5. The combination according to claim 4 wherein said weakened region of attachment of said cover cap substantially surrounds each of said first and second support means.

6. The combination according to claim 5 wherein said spaced-apart support means are located on diametrically opposite sides of said second end of said retaining ring.

7. The combination according to claim 6 wherein said retaining ring is in the form of a section of a hollow cylinder and the water discharge pipe portion is a hollow cylinder.

8. The combination according to claim 7 wherein the inside of said water discharge pipe portion adjacent the open end thereof and said retaining ring have corresponding mating threads, so that said telescoping movement of said retaining ring into the open end of the water discharge pipe is effected by rotating said retaining ring with said mating threads engaged.

9. The combination according to claim 8 wherein said first and second support means are spaced 180° apart and further include means thereon for engagement by a tool to effect rotation of said retaining ring.

10. The combination according to claim 9 wherein said weakened region of attachment is broken by pressure between the end of the water discharge pipe and said flange of said cover cap as said retaining ring is rotated into said open end of said water pipe.

11. The combination according to claim 3 wherein said spaced-apart support means are located on diametrically opposite sides of said second end of said retaining ring.

12. The combination according to claim 11 wherein said means for effecting release of said cover cap comprises a weakened region of attachment of said cover cap to said spaced-apart support means.

13. The combination according to claim 12 wherein said weakened region of attachment is broken by pressure between the end of the water discharge pipe and said flange of said cover cap as said retaining ring is rotated into said open end of said water pipe.

14. The combination according to claim 1 wherein said retaining ring is in the form of a section of a hollow cylinder and the water discharge pipe portion is a hollow cylinder.

15. The combination according to claim 14 wherein the inside of said water discharge pipe portion adjacent the open end thereof and said retaining ring have corresponding mating threads, so that said telescoping movement of said retaining ring into the open end of the water discharge pipe is effected by rotating said retaining ring with said mating threads engaged.

16. An improved eyeball return fitting for pools and spas including in combination:

an eyeball member having a passageway therethrough;

a main housing for said eyeball member comprising a substantially hollow cylindrical member with a shoulder therein for engagement with said eyeball member to permit rotation of said eyeball member therein, said housing having first and second ends, the first end thereof constructed for attachment to a water supply pipe and the second end thereof constructed to receive a telescoping eyeball retaining ring therein;

a retaining ring, with first and second ends, constructed for telescoping movement of the first end thereof into the inside of the second end of said housing, said retaining ring first end having a shoulder portion therein for engaging said eyeball member;

a cover cap releasably attached to the second end of said retaining ring and dimensioned to overlie and cover the second end of said main housing; and means for effecting release and removal of said cover cap.

17. The combination according to claim 16 further including first and second spaced-apart support means attached to the second end of said retaining ring and extending outwardly therefrom for supporting said cover cap a predetermined spaced distance from the second end of said retaining ring.

18. The combination according to claim 17 wherein said means for effecting release of said cover cap comprises a weakened region of attachment of said cover cap to said spaced-apart support means.

19. The combination according to claim 18 wherein said weakened region of attachment is broken by pressure between the end of the water discharge pipe and said flange of said cover cap as said retaining ring is rotated into said open end of said water pipe.

20. The combination according to claim 19 wherein said first and second support means are spaced 180° apart and further include means thereon for engagement by a tool to effect rotation of said retaining ring.

21. The combination according to claim 20 wherein said weakened region of attachment of said cover cap substantially surrounds each of said first and second support means.

* * * * *